Patented July 16, 1935

2,008,003

UNITED STATES PATENT OFFICE 2,008,003

LEAD PHENOLATE AND METHOD OF MAKING SAME

Wallace H. Carothers, Fairville, Pa., assignor to E. I. du Pont de Nemours & Company, Wilmington, Del., a corporation of Delaware No Drawing. Application October 20, 1931, Serial No. 570,033

22 Claims. (Cl. 260—11)

This invention relates to the trialkyllead salts of phenols and their mode of preparation.

An object of the invention relates to novel and useful organic compounds containing lead, and methods of preparing the same.

These objects are accomplished by the following invention which involves the preparation of organolead hydroxylates of aromatic compounds containing phenolic groups. These phenolic hydroxyl groups are attached to a carbon of the ring forming the aromatic nucleus. The organic radicals other than the phenolic radical, which may be attached to the lead atom include all univalent hydrocarbon radicals, aliphatic, aromatic, aliphatic-aromatic, aromatic-aliphatic, hydro-aromatic, saturated or unsaturated, or combinations of these. Hydrocarbon radicals having non-hydrocarbon constituents are included. Throughout the specification and claims an aliphatic radical is called an "alkyl" radical and an aromatic radical is called an "aryl" radical.

The simple phenols may be represented by the formula:

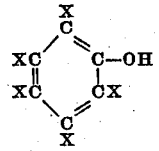

where (X) may be hydrogen or any substituent such as alphyl, e. g., methyl, ethyl, butyl amyl, etc.; aryl, e. g., phenyl, naphthyl, etc.; aralphyl, e. g., benzyl; alkoxyl, e. g., methoxyl, phenoxyl, ethoxyl, etc.; halogen, e. g., chloro, bromo, iodo, fluoro; carboxyl; sulfonyl; ketone, e. g., acetyl ($CH_3CO$), benzoyl ($C_6H_5CO$); aldehyde; carbalkoxyl, e. g., —CO—O—$CH_3$, —CO—O$C_6H_5$ etc.; and hydroxyl where the phenol is a polyhydric phenol.

The substituent may be linked doubly to the aromatic nucleus as in hydroxy anthraquinone

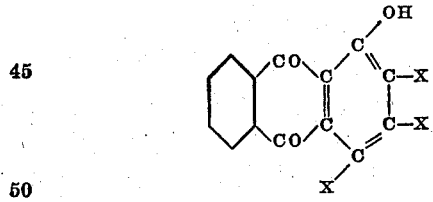

where the substituent is the phthalyl group $C_6H_4(CO)_2$. Similarly, two positions may be substituted by an alkylene dioxy group such as methylene dioxy —O—$CH_2$—O—. In short, any compound which contains a phenolic hydroxy group is suitable. The more complex phenols such as naphthols may in a like manner be represented by the formula:

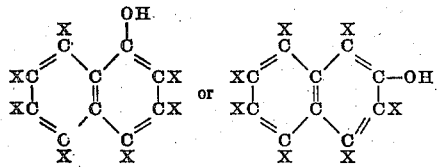

in which X has the same significance as has been described with relation to the simple phenols.

The preparation of these organolead phenolates involves the reaction of an organolead compound having four hydrocarbon radicals attached to the lead atom, with phenols at temperatures ranging from 75° C. to 175° C. The reaction takes place with or without solvents and with or without the help of catalysts. Below the above noted temperature range, no reaction was detected and above said range of temperature decomposition was in evidence. Silica gel has been found to catalyze the reaction. Monoethyl ether of ethylene glycol has been found to be a good solvent medium, although other organic solvents, such as benzene, toluene, xylene, mesitylene, ethylbenzene, polyethylbenzenes, methyl cellosolve and carbitol having similar properties may be used in lieu thereof.

Compounds obtained in this way where monohydric phenols are used, have been identified as organolead phenolates used and having the general formula:

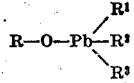

This reaction is not limited to monohydric phenols but is likewise applicable to polyhydric phenols. Thus the product usually obtained from dihydric phenols, for example, is a bis-trialyllead salt and may be assigned the general formula:

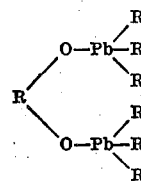

The (R) groups represented in these formulæ may be phenyl, naphthyl, anthracenyl, substituted phenyls, substituted naphthyls, substituted anthracenyls, etc. $R^1$, $R^2$, and $R^3$ may be alike or may be different and may be aliphatic, aromatic, hydroaromatic, saturated or unsaturated radicals.

Similar formulæ can be assigned to the reaction products of the organolead compounds having four hydrocarbon radicals attached to the lead atom with polyhydric phenols such as pyrogallol.

These hydroxylates are not generally very soluble in organic solvents or water. They hydrolyze slowly in water, readily in dilute acids, and completely in concentrated acids.

The following examples illustrate various ways of carrying out the invention:

*Example I*

Fourteen and five tenths grams of phenol and forty-nine grams of tetraethyllead were heated at 150–155° C. for 2½ hours in the presence of a small amount of silica gel (.25 g.). The reaction mixture solidified when allowed to cool. The solid material when recrystallized from benzene, in which it was slightly soluble, was a yellowish powder which did not melt but decomposed at about 205° C. Thirty-eight grams of this material was obtained which represented a 63.5% yield.

Analysis showed this material to be triethyllead phenolate.

*Example II*

Four and seven tenths grams of phenol and sixteen and five tenths grams of tetraethyllead were heated together at 150–160° C. for three hours. The solid product was recrystallized from benzene. Seven and five tenths grams of yellow powder was obtained which was identified as the same material obtained in Example I.

*Example III*

Ten grams of o-cresol and thirty-three grams tetraethyllead were heated under reflux with a small amount of silica gel for seven hours at 140–150° C. The solid product was recrystallized from meta-cresol, yielding 33 grams of a gray powder which represented about 90% of the theoretical yield of triethyllead cresolate. This material decomposed at about 185° C.

*Example IV*

Ten grams of resorcinol and thirty-three grams of tetraethyllead were heated for two hours at 140–150° C. The product was extracted three times with absolute alcohol and dried. Analyses indicated that both phenolic groups had been attacked and the product was bis-triethyllead resorcinate. Twenty-one grams of this pink powder represented a 31% yield. This material decomposed at about 235° C.

*Example V*

Three grams of catechol and eighteen grams of tetraethyllead were dissolved in monoethyl ether of ethylene glycol and a small amount of silica gel added. This mixture was heated under reflux at 135°–145° C. for eight hours. The insoluble product was filtered off and washed several times with ether. The light yellow powder decomposed at 245° C. Analysis indicated that it was a bis-triethyllead hydroxylate of catechol.

*Example VI*

The same type of triethyllead hydroxylates was obtained when meta-cresol, p-cresol, hydroquinone, o-bromo phenol, salicyl aldehyde, creosole, alpha-naphthol, beta-naphthol, p-hydroxydiphenyl, pp'-dihydroxydiphenyl, and guaiacol were used.

Although the examples disclose the reaction as applied to one form of hydrocarbon lead, viz., tetraethyllead, it will be understood that this compound is typical of the reactivity of hydrocarbon lead salts generally. Thus similar hydrocarbon lead phenolates may be obtained by reacting other organolead compounds having four hydrocarbon groups attached to the lead atom with phenolic bodies such as those already noted. Suitable lead compounds are tetramethyllead, trimethylethyllead, methyl-triethyllead, dimethyldiethyllead, tetraisoamyllead, dimethylethylisobutyllead, tetraisopropyllead, triethylallyllead, triethylbenzyllead, tetracyclohexyllead, diethylcyclopentamethylenelead, tetrophenyllead, triphenyl-αnaphthyllead, tetra-o-xylyllead, triethyl-αnaphthyllead. In general, any organic lead compound in which there are attached to the lead atom four hydrocarbon or substituted hydrocarbon (e. g., triethyl-bromoamyllead) groups which may be the same or different, is suitable for the reaction.

The term "hydrocarbon lead" as used throughout the specification and claims, as indicated in the preceding paragraph, is intended to apply to the compounds disclosed herein, which hydrocarbon radicals are attached to a lead atom. The term is also intended to embrace radicals which are essentially hydrocarbon in character but which may contain a substituent group, e. g., triethyl-bromoamyllead.

The organolead phenolates are new compounds, and have an extensive commercial utility. They are particularly useful as disinfectants and parasiticides, particularly when used in solution or suspension, being toxic to microbes, bacteria, insects, larvæ, fungi, etc. They are also of value as driers, antioxidants, inhibitors, etc., for varnishes, lacquers, or paints either alone or associated with other modifying agents.

The description and illustrative examples are capable of considerable modification. Any variation which conforms to the spirit of the invention is intended to be included within the scope of the claims.

I claim:

1. A hydrocarbon lead phenolate.
2. Compounds having the formula

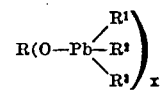

in which $x$ is one or more, R is an aromatic radical, and $R^1$, $R^2$, and $R^3$ are the same or different and are hydrocarbon radicals.

3. A trialkyllead phenolate.
4. A triethyllead phenolate.
5. A triethyllead monohydric phenolate.
6. A triethyllead polyhydric phenolate.
7. Triethyllead phenolate.
8. Triethyllead naphtholate.
9. The process which comprises heating an alkyllead compound and a phenol.
10. The process which comprises heating a tetraalkyllead and a phenol.
11. The process which comprises heating tetraethyllead and a phenol.
12. The process which comprises heating tetraethyllead and a monohydric phenol.
13. The process which comprises heating tetraethyllead and a polyhydric phenol.
14. The process which comprises heating tetraethyllead and phenol.
15. The process which comprises reacting a tetraalkyllead and a phenol at a temperature of 75°–175° C.

16. The process which comprises heating a tetraalkyllead and a phenol in the presence of silica gel.

17. The process which comprises heating a tetraalkyllead in solution and a phenol.

18. The process which comprises heating a tetraalkyllead in solution and a phenol in the presence of silica gel.

19. The process which comprises reacting tetraethyllead dissolved in monoethyl ether of ethylene glycol, and phenol in the presence of a small amount of silica gel and at a temperature of 75°–175° C.

20. The process which comprises heating a hydrocarbon lead compound and a phenol.

21. The process of claim 20 in which the lead compound contains four hydrocarbon radicals attached to the lead atom.

22. Triethyllead cresolate.

WALLACE H. CAROTHERS.